(12) United States Patent
Iwata et al.

(10) Patent No.: US 12,175,173 B2
(45) Date of Patent: Dec. 24, 2024

(54) SCATTERING MEASUREMENT ANALYSIS METHOD, SCATTERING MEASUREMENT ANALYSIS DEVICE, AND NON-TRANSITORY COMPUTER-READABLE STORAGE MEDIUM STORING SCATTERING MEASUREMENT ANALYSIS PROGRAM

(71) Applicant: Rigaku Corporation, Akishima (JP)

(72) Inventors: Tomoyuki Iwata, Akishima (JP); Kazuhiko Omote, Akishima (JP); Kazuki Ito, Akishima (JP); Tetsuya Ozawa, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 778 days.

(21) Appl. No.: 17/132,095

(22) Filed: Dec. 23, 2020

(65) Prior Publication Data
US 2021/0200922 A1    Jul. 1, 2021

(30) Foreign Application Priority Data
Dec. 27, 2019 (JP) ................................ 2019-239494

(51) Int. Cl.
  *G06F 30/25*    (2020.01)
  *G01N 23/201*   (2018.01)
  *G06F 111/10*   (2020.01)

(52) U.S. Cl.
  CPC ........... *G06F 30/25* (2020.01); *G01N 23/201* (2013.01); *G01N 2223/305* (2013.01); *G06F 2111/10* (2020.01)

(58) Field of Classification Search
  CPC ..... G01N 2223/054; G01N 2223/1016; G01N 2223/305; G01N 2223/649; G01N 23/201;
(Continued)

(56) References Cited

U.S. PATENT DOCUMENTS

2004/0195498 A1* 10/2004 Omote ................. G01N 23/201
                                                              250/281
2014/0324401 A1* 10/2014 Kishimoto ........... G01N 23/207
                                                                703/2
(Continued)

FOREIGN PATENT DOCUMENTS

EP           3534679 A1    9/2019

OTHER PUBLICATIONS

EPO Extended European Search Report for corresponding EP Application No. 20215862.2; Dated Jul. 21, 2021.
(Continued)

*Primary Examiner* — Dani Fox
*Assistant Examiner* — Soorena Kefayati
(74) *Attorney, Agent, or Firm* — CANTOR COLBURN LLP

(57) ABSTRACT

Provided is a scattering measurement analysis method including obtaining a theoretical scattering intensity from a structural model that contains a lot of scatterers, wherein the obtaining of a theoretical scattering intensity includes obtaining a contribution to the theoretical scattering intensity of a pair of a scatterer "m" and a scatterer "n" existing at a distance "r" from the scatterer "m" among a plurality of scatterers by at least one of calculations in accordance with the distance "r", the calculations including a first calculation of calculating contributions of the scatterer "m" and the scatterer "n" from respective scattering factors $f_m(q)$ and $f_n^*(q)$ and a center-to-center distance $r_{mn}$ between the scatterer "m" and the scatterer "n", and a second calculation of substituting the scattering factor $f_n^*(q)$ of the scatterer "n" by a first representative value and substituting a probability density function of the number of scatterers existing at the distance "r" by a constant value.

4 Claims, 5 Drawing Sheets

(58) Field of Classification Search
CPC ......... G01N 23/20008; G01N 23/2055; G01N 2223/641; G01N 15/088; G01N 15/2011; G01N 15/1429; G01N 15/1493; G06F 2111/10; G06F 30/25
See application file for complete search history.

(56) References Cited

U.S. PATENT DOCUMENTS

| | | | |
|---|---|---|---|
| 2015/0051877 A1* | 2/2015 | Bakeman | G01N 23/223 703/1 |
| 2017/0153189 A1* | 6/2017 | Paulus | G01N 23/20083 |
| 2017/0307548 A1* | 10/2017 | Bykanov | G21K 1/04 |
| 2018/0328868 A1* | 11/2018 | Bykanov | H01L 21/67282 |
| 2019/0049602 A1* | 2/2019 | Hench | G01N 23/201 |
| 2020/0057386 A1* | 2/2020 | Mossavat | G03F 7/70491 |
| 2020/0088516 A1* | 3/2020 | Hagihara | G01B 15/04 |
| 2020/0256811 A1* | 8/2020 | Thorne | G01N 23/20025 |
| 2022/0027364 A1* | 1/2022 | Kanazawa | G01N 23/20 |

OTHER PUBLICATIONS

Rambo et al., "Super-Resolution in Solution X-Ray Scattering and Its Applications to Structural Systems Biology", Annual Review of Biophysics, Mar. 2013, 31 pages.

Debye, P. J. W., , Ann.Phys. 351, pp. 809 to 823, 1915 (with English concise explanation of relevance of cited reference).

Lazzari, "IsGISAXS: a program for grazing-incidence small-angle X-ray scattering analysis of supported islands"; JAC Research Papers; J. Appl. Cryst. (2002), 35, 406-421.

Online Dictionary of Crystallography, "Atomic scattering factor"; Nov. 8, 2017.

Scardi et al,, "Celebrating 100 years of the Debye scattering equation"; Foundations Advances; vol. 72; Part 6; Nov. 2016; pp. 589-590.

* cited by examiner

SCATTERING MEASUREMENT ANALYSIS METHOD, SCATTERING MEASUREMENT ANALYSIS DEVICE, AND NON-TRANSITORY COMPUTER-READABLE STORAGE MEDIUM STORING SCATTERING MEASUREMENT ANALYSIS PROGRAM

CROSS-REFERENCE TO RELATED APPLICATION

The present application claims priority from Japanese patent application JP 2019-239494 filed on Dec. 27, 2019, the content of which is hereby incorporated by reference into this application.

BACKGROUND OF THE INVENTION

1. Field of the Invention

The present invention relates to a scattering measurement analysis method and a scattering measurement analysis device, and more particularly, to a technology for calculating a theoretical scattering intensity from a system that consists a large number of scatterers.

2. Description of the Related Art

In recent years, scattering measurement has been used as a method for structural analysis. For example, a small-angle X-ray scattering measurement is particularly gaining attention as a method capable of analyzing nanometer scale structure of a sample. In the small-angle X-ray scattering measurement, a scattered X-ray having a scattering angle up to a few degrees is measured.

In scattering measurement for a sample that includes a large number of scatterers, a theoretical scattering intensity is calculated as a function of a scattering vector "q" (or a scattering angle 2θ) based on a structural model that consists a large number of scatterers, and structural information on the sample can be obtained by fitting the theoretical scattering intensity to the measured scattering intensity data.

Description will now be given of a theoretical scattering intensity I(q) of the structural model that consists a large number of scatterers. The symbol "q" of the theoretical scattering intensity I(q) is the scattering vector, that is a difference between wave number vectors of an incident X-ray and an scattered X-ray. A magnitude of the scattering vector "q" can be given by Expression 1.

$$q = \lfloor \vec{q} \rfloor = \frac{4\pi}{\lambda}\sin\left(\frac{2\theta}{2}\right) \quad (1)$$

In Expression 1, λ is a wavelength of X-ray, and 2θ is the scattering angle. The theoretical scattering intensity I(q) is given by Expression 2.

$$I(\vec{q}) = \sum_m \sum_n \hat{f}_m(\vec{q})\hat{f}_n^*(\vec{q})e^{-i\vec{q}\vec{r}_{mn}} \quad (2)$$

The structural model consists number of N particles. The symbol $f_m(q)$ is a scattering factor (there is a hat over "$f_m$" in Expression 2) of the scatterer "m" (m: any integer satisfying 1≤m≤N) corresponding to the scattering vector "q". The "scattering factor" $f_m(q)$ has a structural information of the constituent scatterer "m" and $f_m^*(q)$ is representative of complex conjugate for $f_m(q)$. A vector $r_{mn}$ is a difference between position vectors of the scatterer "m" and a scatterer "n" (n: any integer satisfying 1≤n≤N). A summation symbol $\Sigma_m$ means a summation of the scatterers "m" from 1 to N. The same applies to a summation symbol $\Sigma_n$.

If we assume an isotropic system and average the orientation of the vector "q", then Expression 2 can be written by Expression 3. Expression 3 is described in Debye, P. J. W., Ann. Phys. 351, pp. 809 to 823, 1915.

$$I(q) = \sum_m \sum_n f_m(q)f_n^*(q)\frac{\sin qr_{mn}}{qr_{mn}} \quad (3)$$

In Expression 3, "q" is a magnitude (scalar quantity) of the scattering vector "q" given by Expression 1. The symbol $f_m(q)$ is a scattering factor obtained by applying directional averaging to the scattering factor $f_m(q)$ given by Expression 2 (there is a hat over "$f_m$" in Expression 2). The symbol $r_{mn}$ is a center-to-center distance between the scatterer "m" and the scatterer "n". A quotient of sin $qr_{mn}$ by $qr_{mn}$ is generally referred to as the "unnormalized sinc function." In the present application, Expression 3 is referred to as "Debye scattering equation (DES)." The theoretical scattering intensity I(q) with respect to the magnitude of the scattering vector "q" is calculated through use of the DES for the structural model that consists a large number of scatterers.

The theoretical scattering intensity calculated through the DES depends on the number of the contained scatterers N. N must be large enough to describe measured intensity data containing information on the measured system. However, when the number of the scatterers N is increased, a period of time required for calculation of the DES drastically increases accordingly. For example, when a cell size of the model that contains N scatterers is increased by A times, a volume of the object model increases by $A^3$ times and number of the scatterers N in the model also increases by $A^3$ times. The respective sums of the scatterer "m" and the scatterer "n" are calculated, and hence the calculation period is disadvantageously increased by $A^6$ times.

SUMMARY OF THE INVENTION

The present disclosure has been made in view of the above-mentioned problem, and has an object to provide a scattering measurement analysis method, a scattering measurement analysis device, and a non-transitory computer-readable storage medium storing a scattering measurement analysis program which are configured to calculate a theoretical scattering intensity through a method having a suppressed constraint on a size of a calculation model.

(1) In order to solve the above-mentioned problem, according to at least one embodiment of the present disclosure, there is provided a scattering measurement analysis method including obtaining a theoretical scattering intensity from a structural model in a system that contains a large number of scatterers, wherein the obtaining of a theoretical scattering intensity includes obtaining a contribution to the theoretical scattering intensity of a pair of a scatterer "m" and a scatterer "n" existing at a distance "r" from the scatterer "m" among a plurality of scatterers, by at least one of calculations in accordance with the distance "r", the calculations including a first calculation of calculating contributions of the scatterer "m" and the scatterer "n" from respective scattering factors $f_m(q)$ and $f_n^*(q)$ and a center-to-center distance $r_{mn}$ between the scatterer "m" and the scatterer "n", and a second calculation of substituting the scattering factor $f_n^*(q)$ of the scatterer "n" by a first representative value and substituting a probability density function of the number of scatterers existing at the distance "r" by a constant value.

(2) In the calculation of the contribution to the theoretical scattering intensity, when the distance "r" of the scatterer "n" from the scatterer "m" is shorter than a certain value R, the contribution to the theoretical scattering intensity may be calculated from the scattering factor $f_m(q)$, the scattering factor $f_n^*(q)$, and the center-to-center distance $r_{mn}$. When the distance "r" is equal to or longer than R, the scattering factor $f_n^*(q)$ of the scatterer "n" may be substituted by the first representative value. Further, the probability density function of the number of scatterers existing at the distance "r" may be substituted by the constant value.

(3) In the calculation of the contribution to the theoretical scattering intensity, a calculation result of the first calculation and a calculation result of the second calculation may be combined at a ratio obtained by using a first function that continuously changes from 0 to 1 as the distance "r" of the scatterer "n" from the scatterer "m" increases.

(4) The first representative value substituting the scattering factor of the scatterer "n" may be an average value of scattering factors of the plurality of scatterers.

(5) The theoretical scattering intensity may include, as one of a part of an integrand and a part of a numerical sequence to be summed, a second function that is derived in consideration of a coherence length of a probe to be used to measure scattering, and that monotonically decreases from 1 to 0 as the distance "r" increases. One of the integrand and the sum may be calculated in a range to the distance "r" at which the second function is 0.

(6) According to at least one embodiment of the present disclosure, there is provided a scattering measurement analysis device including theoretical scattering intensity obtaining means for obtaining a theoretical scattering intensity from a structural model that consists a lot of scatterers, wherein the theoretical scattering intensity obtaining means is configured to obtain a contribution to the theoretical scattering intensity of a pair of a scatterer "m" and a scatterer "n" existing at a distance "r" from the scatterer "m" among a plurality of scatterers by at least one of calculations in accordance with the distance "r", the calculations including a first calculation of calculating contributions of the scatterer "m" and the scatterer "n" from respective scattering factors $f_m(q)$ and $f_n^*(q)$ and a center-to-center distance $r_{mn}$ between the scatterer "m" and the scatterer "n", and a second calculation of substituting the scattering factor $f_n^*(q)$ of the scatterer "n" by a first representative value and substituting a probability density function of the number of scatterers existing at the distance "r" by a constant value.

(7) According to at least one embodiment of the present disclosure, there is provided A non-transitory computer-readable storage medium storing a scattering measurement analysis program for causing a computer to function as theoretical scattering intensity obtaining means for obtaining a theoretical scattering intensity from a structural model that consists a lot of scatterers, the scattering measurement analysis program causing a computer to execute processing comprising, wherein the theoretical scattering intensity obtaining means is configured to obtain a contribution to the theoretical scattering intensity of a pair of a scatterer "m" and a scatterer "n" existing at a distance "r" from the scatterer "m" among a plurality of scatterers by at least one of calculations in accordance with the distance "r", the calculations including a first calculation of calculating contributions of the scatterer "m" and the scatterer "n" from respective scattering factors $f_m(q)$ and $f_n^*(q)$ and a center-to-center distance $r_{mn}$ between the scatterer "m" and the scatterer "n", and a second calculation of substituting the scattering factor $f_n^*(q)$ of the scatterer "n" by a first representative value and substituting a probability density function of the number of scatterers existing at the distance "r" by a constant value.

According to at least one embodiment of the present disclosure, there are provided the scattering measurement analysis method, the scattering measurement analysis device, and the non-transitory computer-readable storage medium storing the scattering measurement analysis program which are configured to calculate the theoretical scattering intensity through the method having a suppressed constraint on the cell size of the calculation model and number of scatterers N in the cell.

DETAILED DESCRIPTION OF THE INVENTION

Figure 1:
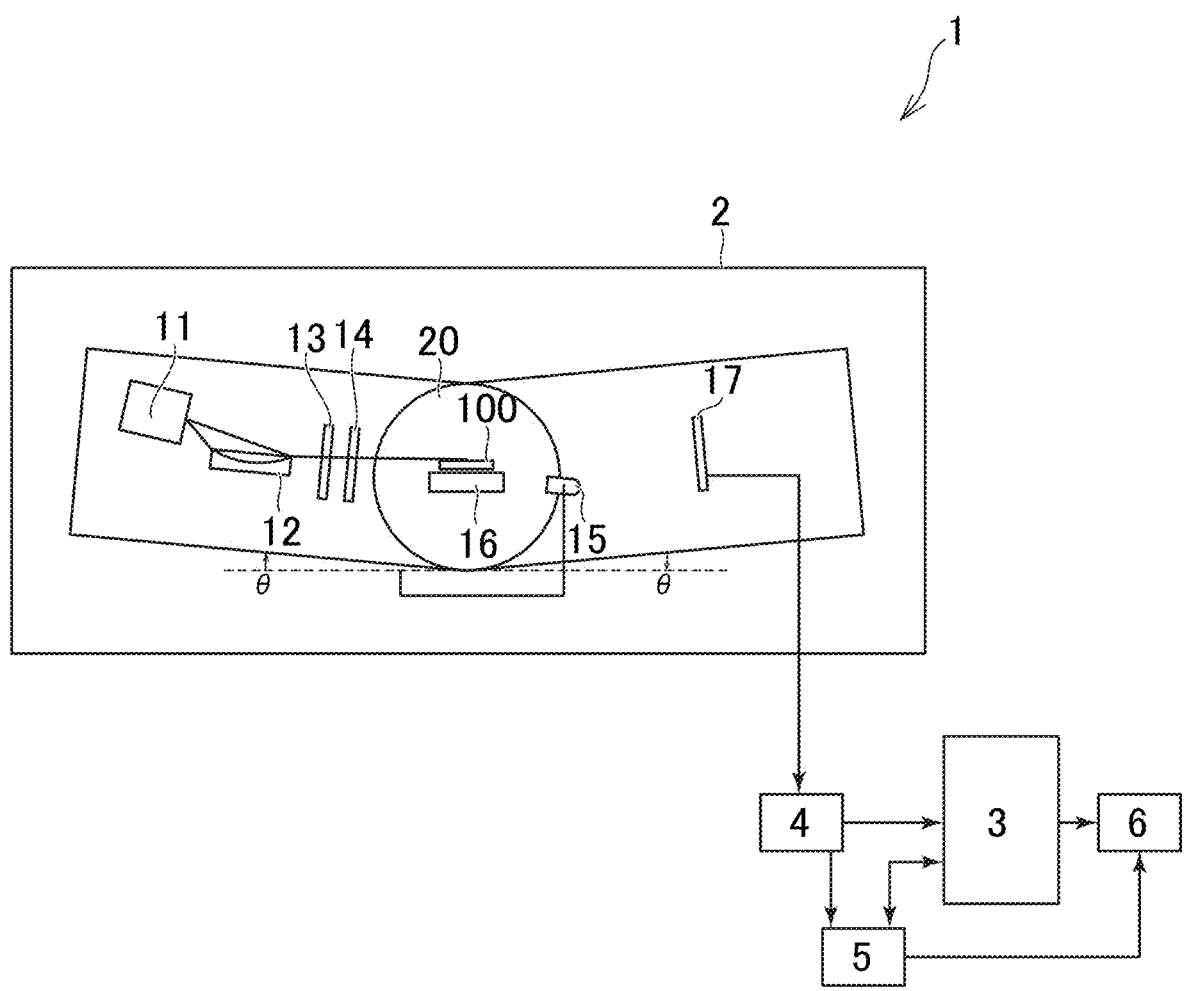
FIG. 1 is a schematic diagram for illustrating structure of a small-angle X-ray scattering measurement device according to at least one embodiment of the present disclosure.

Now, at least one embodiment of the present disclosure will be described with reference to the drawings. For clearer illustration, some sizes, shapes, and the like are schematically illustrated in the drawings in comparison to actual ones. However, the sizes, the shapes, and the like are merely an example, and do not limit understanding of the present invention. Further, like elements to those described relating to the drawings already referred to are denoted by like reference symbols herein and in each of the drawings, and detailed description thereof is sometimes omitted as appropriate.

A small-angle scattering measurement device according to at least one embodiment of the present disclosure is a small-angle X-ray scattering measurement device 1 having a two-pinhole optical system. FIG. 1 is a schematic diagram for illustrating structure of the small-angle X-ray scattering measurement device 1 according to at least one embodiment. As illustrated in FIG. 1, the small-angle X-ray scattering measurement device 1 according to at least one embodiment includes a scattering measurement unit 2, a scattering measurement analysis unit 3, an input unit 4, a storage unit 5, and a display unit 6. The scattering measurement unit 2 includes an X-ray tube 11, a multilayer film mirror 12, a first slit 13, a second slit 14, a beam stopper 15, a support stage 16, a detector 17, and a goniometer 20. The support stage 16 supports a sample 100. An X-ray beam emitted from the X-ray tube 11 is focused by the multilayer film mirror 12, passes through the first slit 13 and the second slit 14, and irradiates the sample 100. A focal point of the focused X-ray beam is ideally the sample 100. A cross section of a reflecting surface of the multilayer mirror 12 is in an ellipsoidal shape. The ellipsoidal shape has two focal points. One focal point is located at an X-ray source of the X-ray tube 11. Another focal point is located at the sample 100. A scattered X-ray generated from the sample 100 is detected by the detector 17.

In the goniometer 20, two arms, which are an incident-side arm and an emitted-side arm, extend with respect to the support stage 16. The detector 17 detects the scattered X-ray at a scattering angle 2θ with respect to the X-ray entering the sample 100 when the incident-side arm is rotated by θ with respect to the support stage 16, and the emitted-side arm is rotated toward an opposite direction by θ with respect to the support stage 16. That is, the goniometer 20 is a θ-θ type, but is not limited to this type, and the goniometer 20 may be a θ-2θ type, in which the support stage 16 is rotated by θ with respect to the incident-side arm and the emitted-side arm is rotated toward the same direction by 2θ. The scattering intensity of the scattered X-ray at the small scattering angle 2θ is measured by the small-angle X-ray scattering measurement. However, at such a small scattering angle 2θ as to be considered as 0, the case in which the scattered X-ray irradiates the detector 17 cannot be distinguished from a case in which the X-ray incident to the sample 100 directly irradiates the detector 17, and the beam stopper 15 is thus arranged at 2θ=0 in order to protect the detector 17. That is, the scattered X-ray at the scattering angle 2θ=0 cannot be detected. The detector 17 is a scintillation counter, which is a zero-dimensional detector, but the detector 17 is not limited to the scintillation counter, and may be a one-dimensional detector or a two-dimensional detector.

Figure 2:
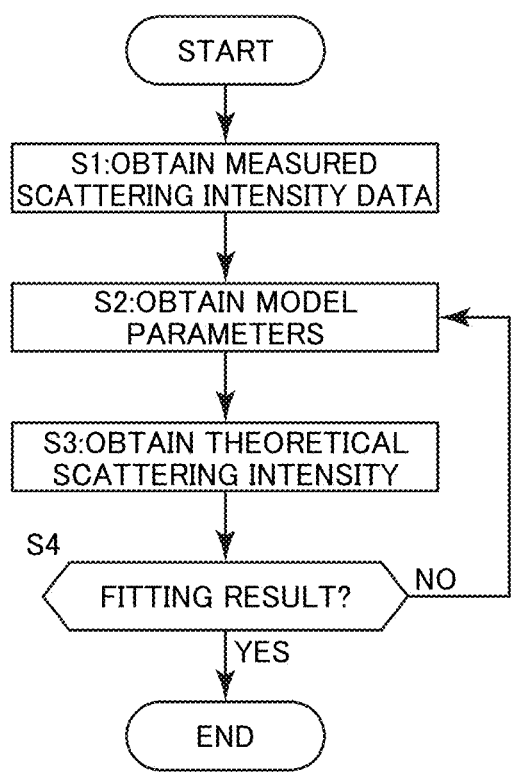
FIG. 2 is a flowchart for illustrating a scattering measurement analysis method according to at least one embodiment of the present disclosure.

FIG. 2 is a flowchart for illustrating a scattering measurement analysis method according to at least one embodiment. A specific and detailed description will now be given of the scattering measurement analysis method according to at least one embodiment. The scattering measurement analysis method according to at least one embodiment is performed by the small-angle X-ray scattering measurement device 1 according to at least one embodiment. That is, the small-angle X-ray scattering measurement device 1 according to at least one embodiment is a scattering measurement analysis device capable of using the scattering measurement analysis method according to at least one embodiment to perform structural analysis of the sample. The scattering measurement analysis unit 3 of the small-angle X-ray scattering measurement device 1 is implemented by a computer used generally. The scattering measurement unit 2 measures the small-angle X-ray scattering intensity corresponding to the scattering angle 2θ of the sample 100 (or the magnitude "q" of the scattering vector), and outputs measured scattering intensity data to the input unit 4. The scattering measurement analysis unit 3 obtains the measured scattering intensity data from the input unit 4. The scattering measurement analysis unit 3 may cause the storage unit 5 to hold the obtained measured scattering intensity data.

The input unit 4 includes a keyboard and a mouse in addition to an interface with the scattering measurement unit 2 (detector 17). The input unit 4 is configured to obtain the information output using the scattering measurement unit 2, and further obtain information that is input by a user. The input unit 4 is configured to output the obtained information to the scattering measurement analysis unit 3. The display unit 6 includes a display. Structural analysis results analyzed by the scattering measurement analysis unit 3 are output to the display unit 6, and the display unit 6 displays the results. In this case, the information output by the input unit 4 to the scattering measurement analysis unit 3 may also be displayed.

The scattering measurement analysis unit 3 of the small-angle X-ray scattering measurement device 1 according to at least one embodiment includes means for performing respective steps described below. Moreover, the scattering measurement analysis program according to at least one embodiment is a program for causing a computer to function as each of the means. The program may be stored in a computer-readable information recording medium, and may be loaded from the medium onto the computer.

[Step 1 (S1): Measured Scattering Intensity Data Obtaining Step]

In Step 1, the measured scattering intensity data on the sample is obtained. As described above, the scattering measurement unit 2 measures the small-angle X-ray scattering intensity of the sample 100, and the scattering measurement analysis unit 3 obtains the measured scattering intensity data through the input unit 4. The scattering measurement analysis unit 3 may obtain the measured scattering intensity data held in the storage unit 5. In order to clearly distinguish the measured scattering intensity data and a theoretical scattering intensity from each other, the former may be referred to as "measurement curve of the scattering intensity," and the latter may be referred to as "theoretical curve of the scattering intensity."

[Step 2 (S2): Model Parameter Obtaining Step]

In Step 2, structure model parameters required to calculate the theoretical scattering intensity corresponding to the scattering vector are obtained. The structure model parameters may be input to the input unit 4 by the user, and at least some of these parameters may be automatically set. Details of the structure model parameters are described later.

[Step 3 (S3): Theoretical Scattering Intensity Obtaining Step]

In Step 3, the theoretical scattering intensity is calculated based on a structural model that consists a lot of scatterers. In this step, the scattering measurement analysis unit 3 uses the DES (Expression 3) to calculate the theoretical scattering intensity, and obtains the theoretical scattering intensity, but the configuration is not limited to this example. The theoretical scattering intensity calculated in advance by the scattering measurement analysis unit 3 or an external computer may be held in the storage unit 5, and the scattering measurement analysis unit 3 may obtain the theoretical scattering intensity held in the storage unit 5. In at least one embodiment, the following calculation expression is used in calculation of the DES (Expression 3), and a detailed description will now be given thereof.

When the sum with respect to a scatterer "n" is divided into two cases, including a case in which a distance $r_{mn}$ from a scatterer "m" is shorter than R and a case in which the distance $r_{mn}$ is equal to or longer than R, Expression 4 is given from Expression 3.

$$I(q) = \sum_m \sum_{n, r_{mn} < R} f_m(q) f_n^*(q) \frac{\sin q r_{mn}}{q r_{mn}} + \sum_m \sum_{n, r_{mn} \geq R} f_m(q) f_n^*(q) \frac{\sin q r_{mn}}{q r_{mn}} \quad (4)$$

A second term on the right side of Expression 4 is now focused upon. As a distance "r" increases, the number of scatterers "n" existing at the distance "r" increases. Therefore, in a case in which the distance R is sufficiently long, and a scattering factor $f_n^*(q)$ of the scatterer "n" can thus be statistically substituted by an average value $f_{ave}^*(q)$ of the scattering factors with calculating N of scatterers (Expression 6), the second term on the right side of Expression 4 is given by Expression 5.

In "the case in which the distance R is sufficiently long, and the scattering factor can thus be statistically substituted by the average value of the scattering factors," the value of R is determined as described below, for example. That is, when it is known that a coefficient of variation of a scatterer radius is 30%, and the number of scatterers per unit volume is 0.0054/nm^3, the number of scatterers N required to obtain an estimated value of an average scatterer radius (population mean) so that an allowable error rate is equal to or less than 5% at a confidence level of 95% is 144. When a volume from the radius R nm to a radius R+1 nm is $4\pi R^2$, the number of particles contained in the volume is 0.0054× $4\pi R^2$. The distance R that satisfies a relationship of $0.0054 \times 4\pi R^2 > 144$ is equal to or longer than 93 nm, and, in "the case in which the scattering factor can be statistically substituted by the average value of the scattering factors," R having a value equal to or longer than 93 nm is used. In the present application, a distance to be used, at which the number of scatterer is large and the scattering factor can thus be statistically substituted by a representative value (for example, the average value), is referred to as "far distance," and a distance to be used, at which the scattering factor cannot be substituted, is referred to as "near distance."

$$\sum_m \sum_{n, r_{mn} \geq R} f_m(q) f_n^*(q) \frac{\sin q r_{mn}}{q r_{mn}} = f_{ave}^*(q) \sum_m \sum_{n, r_{mn} \geq R} f_m(q) \frac{\sin q r_{mn}}{q r_{mn}} \quad (5)$$

The average value $f_{ave}^*(q)$ of the scattering factors $f_n^*(q)$ is given by Expression 6. The scattering factor $f_n^*(q)$ of the scatterer "n" is substituted by the average value $f_{ave}^*(q)$ of the scattering factors of a plurality (N: N is a natural number) of scatterers. A first representative value substituting the scattering factor $f_n^*(q)$ of the scatterer "n" is not limited to the average value $f_{ave}^*(q)$ given by Expression 6, and is only required to be a representative value that can represent the scattering factor $f_n^*(q)$ independently of the value of "n".

$$f_{ave}^*(q) = \frac{1}{N} \sum_n f_n^*(q) \quad (6)$$

When the number of scatterers existing at a distance "r" to a distance r+dr from the scatterer "m" is represented by $\rho_m(r)dv$ through use of a probability density function $\rho_m(r)$ of the distance "r", and the sum with respect to the scatterer "n" is substituted by an integral, Expression 7 is given from Expression 5. The number of scatterers "n" existing at the distance "r" to the distance r+dr from the scatterer "m" is $\rho_m(r)dv$, but in this case, it can simply be considered that the number of scatterers "n" existing at the distance "r" from the scatterer "m" is given by the probability density function $\rho_m(r)$ of the distance "r".

$$\sum_m \sum_{n, r_{mn} \geq R} f_m(q) f_n^*(q) \frac{\sin q r_{mn}}{q r_{mn}} = f_{ave}^*(q) \sum_m f_m(q) \int_{r \geq R}^{V_{max}} \rho_m(r) \frac{\sin qr}{qr} dV \quad (7)$$

In Expression 7, an integral on the right side is a volume integral, and means execution of the volume integral to a maximum value $V_{max}$ of the volume in a range of r≥R. Thus, the DES (Expression 3) is given by Expression 8.

$$I(q) = \sum_m \sum_{n, r_{mn} < R} f_m(q) f_n^*(q) \frac{\sin q r_{mn}}{q r_{mn}} + f_{ave}^*(q) \sum_m f_m(q) \int_{r \geq R}^{V_{max}} \rho_m(r) \frac{\sin qr}{qr} dv \quad (8)$$

In calculation of the theoretical scattering intensity I(q) in Expression 8, when the distance "r" is shorter than R, contributions of the scatterer "m" and the scatterer "n" are calculated from the respective scattering factors $f_m(q)$ and $f_n^*(q)$ and the center-to-center distance $r_{mn}$ (a first term on a right side of Expression 8 (first calculation)). When the distance "r" is equal to or longer than R, the scattering factor of the scatterer "n" is substituted by the first representative value (for example, $f_{ave}^*(q)$), and the number of scatterers existing at the distance "r" is calculated by the probability density function of the distance "r" (a second term on the right side of Expression 8 (second calculation)). In at least one embodiment, various integral values are obtained by executing various algorithms for numerical integration in the scattering measurement analysis unit 3.

When Expression 8 is used to calculate the theoretical scattering intensity I(q), the structure model parameters are as described below. Structure model parameters required to calculate the second term on the right side of Expression 8 are R, $V_{max}$, $f_{ave}^*(q)$, $f_m(q)$, and $\rho_m(r)$. The parameter R is the threshold value of the distance "r" of the scatterer "n" from the scatterer "m". The parameter $V_{max}$ is the maximum value of the volume of the sample. The parameter $f_{ave}^*(q)$ represents the average value of all scattering factors (scattering factors of the N scatterers). The parameter $f_m(q)$ is the scattering factor of each scatterer. The parameter $\rho_m(r)$ is the probability density function of the number of the scatterers existing at the distance "r". In addition, structure model parameters required to calculate the first term on the right side of Expression 8 are $f_m(q)f_n^*(q)$ and $r_{mn}$. The parameter $f_m(q)f_n^*(q)$ is a product of the scattering factors of the scatterer "m" and the scatterer "n". The parameter $r_{mn}$ is a distance determined by an arrangement structure between the scatterer "m" and the scatterer "n".

In a volume integration of the second term on the right side of Expression 8, when the integration is performed between the distance "r" to the distance r+dr, in a case in which the volume is sufficiently large, ρm(r) can be considered as a constant value $\rho_a$. In this case, Expression 8 is given by Expression 9.

"The case in which the volume in the range from the distance 'r' to the distance r+dr is so large that the $\rho_m(r)$ can be considered as the constant value $\rho_a$" means a case in which $\rho_m(r)$ at a distance equal to or longer than a certain distance can be considered as the same value as an average number of particles per unit volume of the structural model used for the calculation. The condition for this case can be determined by calculating whether or not a required number of scatterers or more exist in the volume of the range from the distance "r" to the distance r+dr through the same method as "the case in which the distance R is sufficiently long, and the scattering factor can be statistically substituted by the average value of the scattering factors."

$$I(q) = \qquad\qquad\qquad\qquad\qquad\qquad (9)$$

$$\sum_m \sum_{n, r_{mn} < R} f_m(q) f_n^*(q) \frac{\sin q r_{mn}}{q r_{mn}} + f_{ave}^*(q) \sum_m f_m(q) \int_{r \geq R}^{r_{max}} 4\pi \rho_a r^2 \frac{\sin qr}{qr} dr$$

An integration of the second term on the right side of Expression 9 is an integration with respect to the distance "r", and means that the integration is performed with respect to the distance "r" from R to the maximum value $r_{max}$. The theoretical scattering intensity for a large system can be calculated by increasing the value of $r_{max}$ without changing the structural model that contains a lot of scatterers. $\Sigma_m f_m(q)$ of the second term on the right side of Expression 9 is rewritten to Expression 10 through use of the average value $f_{ave}(q)$.

$$f_{ave}(q) = \frac{1}{N} \sum_m f_m(q) \qquad\qquad\qquad (10)$$

Expression 9 becomes Expression 11 through use of Expression 10. In this transform, only the scattering factor $f_m(q)$ of the scatterer "m" is replaced by the average value $f_{ave}(q)$ of the scattering factors of the plurality of scatterers (N scatterers: N is a natural number), and Expression 9 and Expression 11 are thus the same.

$$I(q) = \qquad\qquad\qquad\qquad\qquad\qquad (11)$$

$$\sum_m \sum_{n, r_{mn} < R} f_m(q) f_n^*(q) \frac{\sin q r_{mn}}{q r_{mn}} + 4\pi N \rho_a f_{ave}(q) f_{ave}^*(q) \int_{r \geq R}^{r_{max}} r^2 \frac{\sin qr}{qr} dr$$

The first term on the right side of Expression 11 changes in accordance with the arrangement of the plurality of scatterers, but the second term on the right side does not change. In Step 3, when Expression 11 is used to calculate the theoretical scattering intensity I(q), differences from the structure model parameters for Expression 8 among the structure model parameters obtained in Step 2 are as described below. Structure model parameters required to calculate the second term on the right side of Expression 11 are the maximum value $r_{max}$ of the distance "r" of the sample in place of the maximum value $V_{max}$ of the volume of the sample in the calculation of Expression 8, and the constant value $\rho_a$ in place of the probability density function $\rho_m(r)$ of the number of scatterers existing at the distance "r". The theoretical scattering intensity can be calculated for a large system by increasing the value of $r_{max}$.

In Expression 11, the distance $r_{min} = R$ of the scatterer "n" from the scatterer "m" is a threshold value, and when $r_{mn}$ is shorter than R, the contributions of the scatterers "m" and "n" are calculated from the respective scattering factors $f_m(q)$ and $f_n^*(q)$ and the center-to-center distance $r_{mn}$ as given by the DES, and when $r_{mn}$ is equal to or longer than R, the probability density function is calculated as the constant value $\rho_a$. However, the configuration is not limited to this example, and a function G(r) that changes from 0 to 1 can be used to replace Expression 11 by Expression 12.

$$I(q) = \sum_m |f_m(q)|^2 + \sum_m \sum_{n \neq m} f_m(q) f_n^*(q) \frac{\sin q r_{mn}}{q r_{mn}} (1 - G(r_{mn})) + \qquad (12)$$

$$4\pi N \rho_a f_{ave}(q) f_{ave}^*(q) \int_0^{r_{max}} r^2 \frac{\sin qr}{qr} G(r) dr$$

When the function G(r) is a step function that has r=R as a threshold value, is thus 0 when r<R, and is 1 when r≥R, Expression 12 and Expression 11 match each other. Moreover, the function G(r) may be a function (defined as "first function") that continuously changes from 0 to 1 as "r" increases, and is, for example, a sigmoid function. In Expression 12, the function G(r) is used to calculate the first term on the right side and the second term on the right side of Expression 9 (or Expression 11) in a manner of superposition. In the calculation of the theoretical scattering intensity I(q) calculated through use of the DES, a first part (third term on the right side of Expression 12), a second part (second term on the right side of Expression 12), and a third part (first term on the right side of Expression 12) are added to one another. The first part is calculated by substituting the scattering factor of the scatterer "n" by the first representative value (for example, the average value $f_{ave}^*(q)$), and multiplying a part of an unnormalized sinc function to be integrated by G(r). The second part is calculated by multiplying a part that calculates the contributions of the scatterer "m" and the scatterer "n" (m≠n) from the respective scattering factors $f_m(q)$ and $f_n^*(q)$ and the center-to-center distance $r_{mn}$ by (1−G(r)). The third part calculates the contributions of the scatterer "m" and the scatterer "n" (m=n) from the scattering factor $f_m(q)$. As given by Expression 12, the second term on the right side and the third term on the right side are calculated in a manner of superposition through calculation while weighting by the function G(r).

In Step 3, when Expression 12 is used to calculate the theoretical scattering intensity I(q), a parameter different from the model parameters for Expression 11 among the model parameters obtained in Step 2 is the function G(r). Therefore, it is further required to obtain the function G(r).

In Expression 11 and Expression 12, in consideration of a coherent length effect of a probe to be used for the scattering measurement, convolution given by Expression 13 is performed.

$$(1/\sqrt{2\pi}\sigma)^3 \int \exp\left(-\left(\frac{q'-q}{\sqrt{2}\sigma}\right)^2\right) dq' \qquad (13)$$

As a result, Expression 11 and Expression 12 are given by Expression 14 and Expression 15, respectively. The symbol σ is a value unique to the device.

$$I(q) = \sum_m \sum_{n, r_{mn} < R} f_m(q) f_n^*(q) \frac{\sin q r_{mn}}{q r_{mn}} C(r_{mn}) + \qquad (14)$$

$$4\pi N \rho_a f_{ave}(q) f_{ave}^*(q) \int_{r \geq R}^{\infty} r^2 \frac{\sin qr}{qr} C(r) dr$$

-continued $$I(q) = \sum_m |f_m(q)|^2 + \sum_m \sum_{n \neq m} f_m(q) f_n^*(q) \frac{\sin q r_{mn}}{q r_{mn}} C(r_{mn})(1 - G(r_{mn})) + \quad (15)$$

$$4\pi N \rho_a f_{ave}(q) f_{ave}^*(q) \int_0^\infty r^2 \frac{\sin qr}{qr} C(r) G(r) dr$$

A function C(r) is given by Expression 16.

$$C(r) = e^{-\frac{r^2 \sigma^2}{2}} \quad (16)$$

The function C(r) is a function (defined as "second function") that monotonically decreases from 1 to 0 as the distance "r" increase. Differences between Expression 11 and Expression 14 and between Expression 12 and Expression 15 are multiplication of the unnormalized sinc function by the function C(r), and that an upper limit of an integral of the last term on the right side is ∞. This is because an integral becomes constant after a distance at which the function C(r) becomes 0. Therefore, the theoretical scattering intensities calculated by Expression 14 and Expression 15 can be considered as theoretical scattering intensities for which a constraint on the size of the system is suppressed.

The suppression of the constraint is not limited to the integration until "the function C(r) becomes 0." When integration to a value at which the function C(r) is sufficiently close to 0 (for example, 10^-12 or less) is performed, the theoretical scattering intensities calculated by Expression 14 and Expression 15 can be considered as theoretical scattering intensities for which the constraint on the size of the system is suppressed.

In Step 3, when Expression 14 or Expression 15 is used to calculate the theoretical scattering intensity I(q), a parameter different from the model parameters for Expression 11 or Expression 12 among the structure model parameters obtained in Step 2 is the function C(r). Therefore, it is further required to obtain the function C(r).

[Step 4 (S4)]: Fitting Step

In Step 4, the theoretical scattering intensity is fitted to the measured scattering intensity data. Some the structure model parameters are used as a fitting function, and a fitting result is evaluated. When the result is determined to be satisfactory, the processing is finished. When the result is determined to be unsatisfactory, the values of the fitting function are changed, and the processing proceeds to Step 2. A theoretical scattering intensity fitted to the measured scattering intensity data is found by repeating the above-mentioned processing. The structure model parameters thereof are used to analyze the special arrangement of the scatterers consisting in the sample.

In this case, the theoretical scattering intensity calculated in Step 3 is used to perform the fitting in Step 4, but the configuration is not limited to this example. Theoretical scattering intensities may be calculated in advance for structural models that consists a lot of scatterers using various structure model parameters, and may be held by the storage unit 5. In this case, in Step 3, the theoretical scattering intensity for (a combination of) object structure model parameters is only required to be obtained from the storage unit 5.

Figure 3:
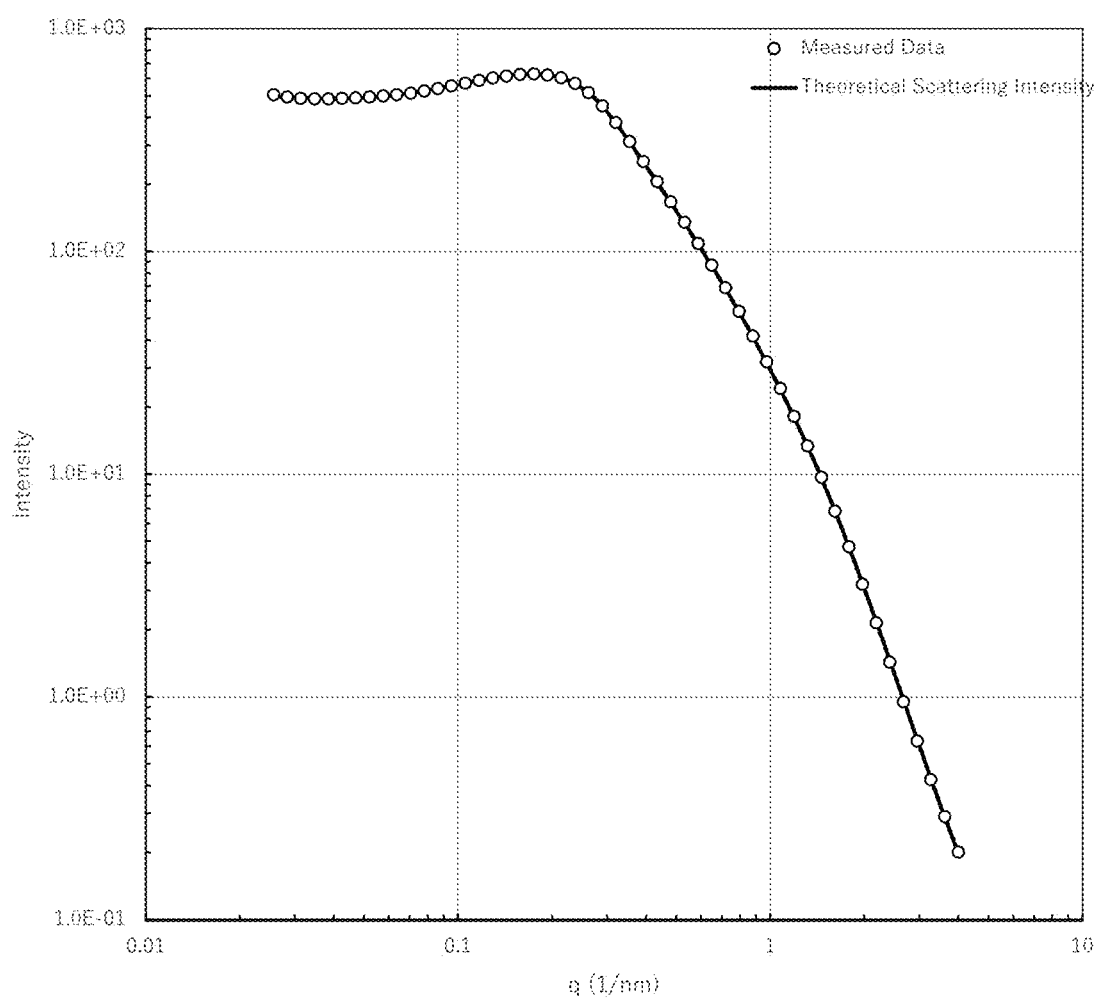
FIG. 3 is a graph for showing analysis results of the scattering measurement analysis method according to at least one embodiment of the present disclosure.

FIG. 3 is a graph for showing analysis results of the scattering measurement analysis method according to at least one embodiment of the present disclosure. In this case, the sample 100 is a bulk sample in a plate form having a thickness of 1 mm, which is made of silica aerogel well known as a porous material. In FIG. 3, there are shown measured scattering intensity data on the silica aerogel and the theoretical scattering intensity for the structure model parameters obtained through the fitting. As shown in FIG. 3, the theoretical scattering intensity can be highly precisely fitted to the measured scattering intensity data.

As the structural model that consists a lot of scatterers, spherical particles arranged in a cubic cell having one side of 200 nm are assumed. A value of a radius of each particle is generated by the random number generator according to the particle size distribution, which is a gamma distribution having a distribution factor of 11.11 and an average particle radius of 1.25 nm. The generation of the particle is continued until an overall volume of the particles corresponding to the volume fraction of the particles, reaches a specified upper limit value. The upper limit value of the volume fraction of the particles is calculated based on a bulk density of the silica aerogel, a mass density of the silica aerogel particle, and a volume of the cubic cell of the structural model. A position (x, y, z) of each particle in the cell is generated as a uniform machine random number, and is used as the structural parameter of the theoretical calculating model for the fitting.

The theoretical scattering intensity I(q) is calculated as given by Expression 15. The probability pa of the number of existing particles is calculated from the number of particles and the volume of the cubic cell.

The value $\sigma$ is set to 0.00205514 nm$^{-1}$. Further, the function G(r) is a sigmoid function given by Expression 17.

$$G(r) = \frac{\tanh\left\{\frac{a}{2}(r - r_0)\right\} + 1}{2} \quad (17)$$

When the average value of the particle radius is represented by $R_{ave}$, in the scattering measurement analysis method according to at least one embodiment, "a" of Expression 17 is given by Expression 18.

$$a = -\frac{\ln 10^{-3}}{R_{ave}} \quad (18)$$

Similarly, $r_0$ of Expression 17 is given by Expression 19.

$$r_0 = 100 - R_{ave} \quad (19)$$

When a radius of the particle "m" is represented by Rm, a density of the particle "m" is represented by $\rho_m$, and a density of a space in which the particles do not exist is represented by $\rho_0$, the scattering factor $f_m(q)$ of the particle "m", which is a spherical particle, is given by Expression 20.

$$f_m(q) = \frac{4\pi}{q^3} (\rho_m - \rho_0) \{\sin(qR_m) - qR_m \cos(qR_m)\} \quad (20)$$

In the scattering measurement analysis method according to at least one embodiment, the density $\rho_m$ of all the particles "m" is the mass density of the silica aerogel, and the density $\rho_0$ of the space in which the particles do not exist is 0.

The structure model parameter changed in at least one embodiment is the position (x, y, z) of the particle, and hence, in Step 3, only the second term on the right side of Expression 9 is calculated again using the new position (x', y', z') of the particle.

Figure 4:
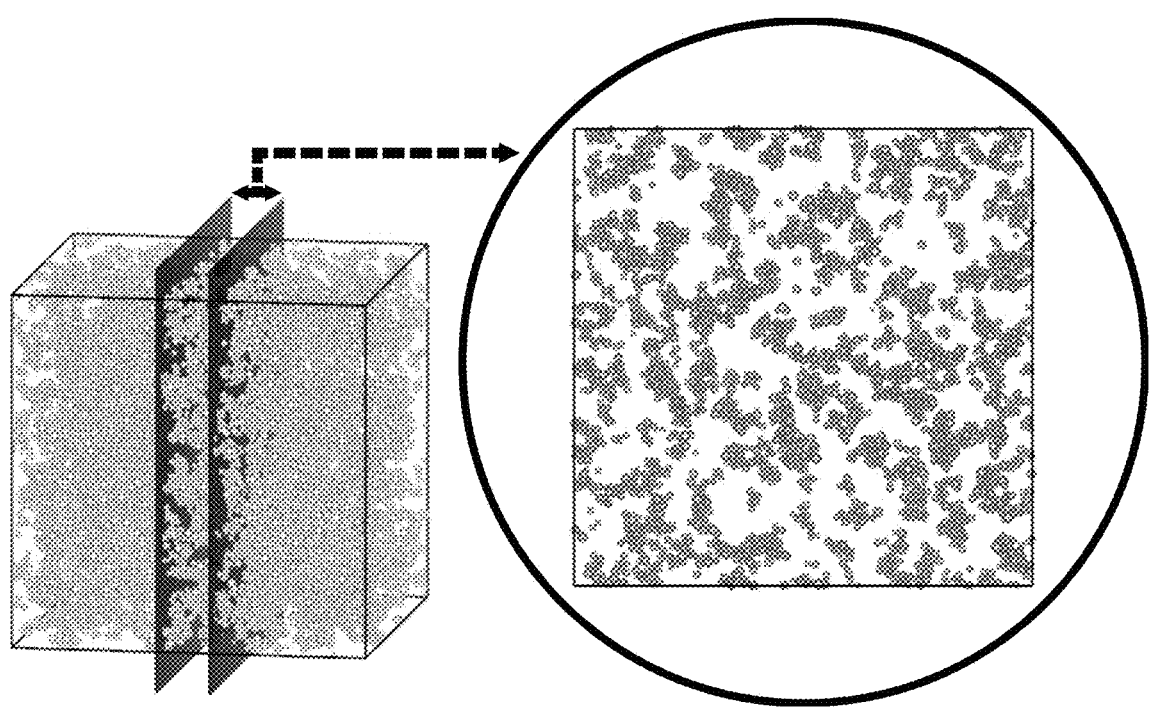
FIG. 4 is a view for illustrating a structural model of a silica aerogel based on the scattering measurement analysis method according to at least one embodiment of the present disclosure.

FIG. 4 is a view for illustrating the structural model of the silica aerogel based on the scattering measurement analysis method according to at least one embodiment. The cell of the structural model is the cube having one side of 200 nm, and 43,243 spherical particles having an average particle diameter of 2.5 nm exist. In FIG. 4, there is shown a structural model of the silica aerogel in which the position of each particle is searched for by means of the Monte Carlo approach though the scattering measurement analysis method according to at least one embodiment. A square indicated by a circle at the right top position of FIG. 4 is a view extracted at a thickness of 30 nm in the vicinity of a center of the cell of the structural model.

Figure 5:
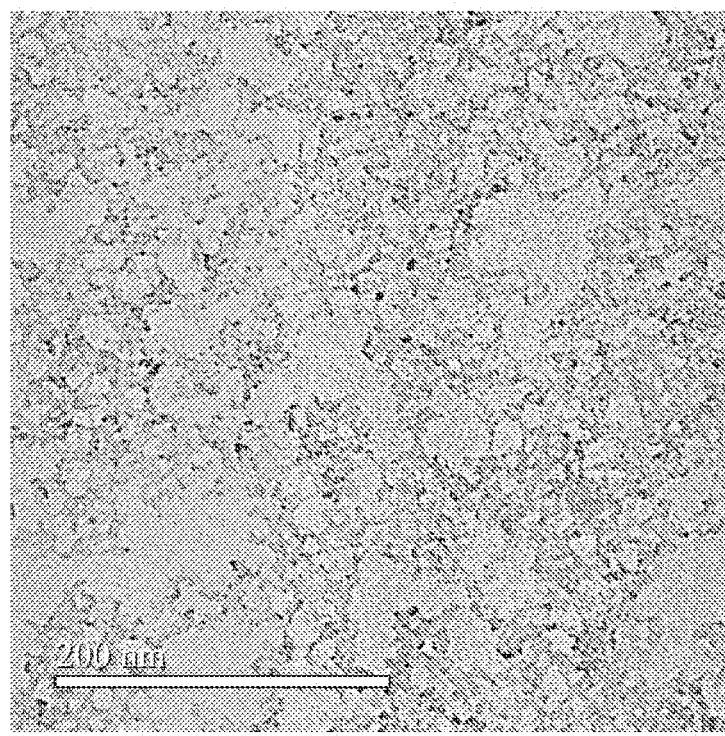
FIG. 5 is an image of the silica aerogel taken by a transmission electron microscope (TEM).

FIG. 5 is an image of the silica aerogel taken by a transmission electron microscope (TEM). Porous structures of the silica aerogel highly precisely match between the model of the silica aerogel illustrated in FIG. 4 and the image of the silica aerogel taken by the TEM, which shows that the scattering measurement analysis method according to at least one embodiment can highly precisely analyze the structure of the scatterer.

Description has been given of the scattering measurement analysis method, the scattering measurement analysis device, and the scattering measurement analysis program according to at least one embodiment of the present disclosure. The scattering measurement analysis method, the scattering measurement analysis device, and the scattering measurement analysis program according to the present invention are not limited to those of at least one embodiment, and can widely be applied. In at least one embodiment, the small-angle X-ray scattering measurement device 1 is the scattering measurement analysis device, but the scattering measurement analysis device is not limited to this example, and the scattering measurement analysis device according to the present invention may not include the scattering measurement unit 2, or may include only the scattering measurement analysis unit 3.

In at least one embodiment, the small-angle scattering measurement device according to at least one embodiment is the small-angle X-ray scattering measurement device 1 that has the two-pinhole optical system, but the small-angle scattering measurement device is not limited to this example, and may be a small-angle X-ray scattering measurement device that has another optical system, or may be a small-angle scattering measurement device that uses not the X-ray, but other radiation sources.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A scattering measurement analysis method comprising:
   measuring, by a scattering measurement unit of an X-ray scattering measurement device, a scattering intensity of scattered X-ray generated from a sample;
   obtaining, by the X-ray scattering measurement device, the measured scattering intensity data through an input unit or storage unit;
   obtaining, by the X-ray scattering measurement device, a theoretical scattering intensity from a structure model that consists a plurality of scatterers, the obtaining of a theoretical scattering intensity including:
   obtaining, by the X-ray scattering measurement device, a contribution to the theoretical scattering intensity of a pair of a scatterer "m" and a scatterer "n" existing at a distance "r" from the scatterer "m" among the plurality of scatterers by at least one of calculations in accordance with the distance "r", the calculations including:
      obtaining, by the X-ray scattering measurement device, scattering factor $f_m(q)$ of the scatterer "m" and $f_n^*(q)$ of the scatterer "n" which is representative of complex conjugate for $f_n(q)$;
      obtaining, by the X-ray scattering measurement device, a probability density function $\rho_m(r)$ of a number of scatterers existing at the distance "r";
      a first calculation, by the X-ray scattering measurement device, of calculating contributions of the scatterer "m" and the scatterer "n" from the respective scattering factors $f_m(q)$ and $f_n^*(q)$ and a center-to-center distance $r_{mn}$ between the scatterer "m" and the scatterer "n", and
      a second calculation, by the X-ray scattering measurement device, of substituting the scattering factor $f_n^*(q)$ of the scatterer "n" by a first representative value and substituting the probability density function $\rho_m(r)$ by a constant value;
   fitting, by the X-ray scattering measurement device, the theoretical scattering intensity to the measured scattering intensity data;
   evaluating, by the X-ray scattering measurement device, a fitting result; and
   finishing, by the X-ray scattering measurement device, the evaluating the fitting result when the fitting result is determined that the theoretical scattering intensity fits the measured scattering intensity data,
   wherein the first representative value substituting the scattering factor of the scatterer "n" is an average value of scattering factors of the plurality of scatter, and
   wherein the first calculation is expressed by a following expression:

$$\sum_m \sum_n f_m(q) f_n^*(q) \frac{\sin q r_{mn}}{q r_{mn}},$$

wherein the second calculation is expressed by following Expression:

$$4\pi N \rho_a f_{ave}(q) f_{ave}^*(q) \int r^2 \frac{\sin qr}{qr} dr,$$

and
   wherein the theoretical scattering intensity is obtained based on the results of the first and second calculations,
   where:
      I (q) denotes the theoretical scattering intensity,
      $f_m$ (q) denotes the scattering factor of scatterer m,
      $f_n^*$(q) denotes scattering factor of scatterer n,
      q denotes a magnitude of difference of wavenumber vectors of incident and outgoing waves, respectively, $r_{mn}$ denotes a distance between centers of scatterers m and n, N denotes the number of scatterers, $f_{ave}$ (q) denotes an average value of scattering factor $f_m$ (q), $f_{ave}^*$(q) denotes an average value of scattering factor $f_n^*$(q), and $\rho_a$ denotes an average number of particles per unit volume of structure model.

2. The scattering measurement analysis method according to claim 1, wherein, in the calculation of the contribution to the theoretical scattering intensity, when the distance "r" of the scatterer "n" from the scatterer "m" is shorter than a certain value R, the contribution to the theoretical scattering intensity is calculated from the scattering factor $f_m$(q), the scattering factor $f_n^*$(q), and the center-to-center distance $r_{mn}$, and when the distance "r" is equal to or longer than R, the scattering factor $f_n^*$(q) of the scatterer "n" is substituted by the first representative value, and the probability density function of the number of scatterers existing at the distance "r" is substituted by the constant value.

3. A scattering measurement analysis method comprising:

measuring, by a scattering measurement unit of an X-ray scattering measurement device, a scattering intensity of scattered X-ray generated from a sample;

obtaining, by the X-ray scattering measurement device, the measured scattering intensity data through an input unit or storage unit;

obtaining, by the X-ray scattering measurement device, a theoretical scattering intensity from a structure model that consists a plurality of scatterers, the obtaining of a theoretical scattering intensity including:

obtaining, by the X-ray scattering measurement device, a contribution to the theoretical scattering intensity of a pair of a scatterer "m" and a scatterer "n" existing at a distance "r" from the scatterer "m" among a plurality of scatterers by at least one of calculations in accordance with the distance "r", the calculations including:

obtaining, by the X-ray scattering measurement device, scattering factor $f_m$(q) of the scatterer "m" and $f_n^*$(q) of the scatterer "n" which is representative of complex conjugate for $f_n$(q);

obtaining, by the X-ray scattering measurement device, a probability density function $\rho_m$(r) of a number of scatterers existing at the distance "r";

a first calculation, by the X-ray scattering measurement device, of calculating contributions of the scatterer "m" and the scatterer "n" from respective scattering factors $f_m$(q) and $f_n^*$(q) and a center-to-center distance $r_{mn}$ between the scatterer "m" and the scatterer "n", and a second calculation, by the X-ray scattering measurement device, of substituting the scattering factor $f_n^*$(q) of the scatterer "n" by a first representative value and substituting a probability density function of a number of scatterers existing at the distance "r" by a constant value;

fitting, by the X-ray scattering measurement device, the theoretical scattering intensity to the measured scattering intensity data;

evaluating, by the X-ray scattering measurement device, a fitting result; and finishing, by the X-ray scattering measurement device, the evaluating the fitting result when the fitting result is determined that the theoretical scattering intensity fits the measured scattering intensity data, wherein the first representative value substituting the scattering factor of the scatterer "n" is an average value of scattering factors of the plurality of scatter, wherein, in the calculation of the contribution to the theoretical scattering intensity, a calculation result of the first calculation and a calculation result of the second calculation are combined at a ratio obtained by using a first function that continuously changes from 0 to 1 as the distance "r" of the scatterer "n" from the scatterer "m" increases, and wherein the theoretical scattering intensity I(q) is obtained based on following Equation (12), which is derived by transforming the first and second calculations:

$$I(q) = \sum_m |f_m(q)|^2 + \sum_m \sum_{n \neq m} f_m(q) f_n^*(q) \frac{\sin q r_{mn}}{q r_{mn}} (1 - G(r_{mn})) + \\ 4\pi N \rho_a f_{ave}(q) f_{ave}^*(q) \int_0^{r_{max}} r^2 \frac{\sin qr}{qr} G(r) dr, \quad (12)$$

where:

I (q) denotes the theoretical scattering intensity, $f_m$ (q) denotes the scattering factor of scatterer m, $f_n^*$(q) denotes scattering factor of scatterer n, q denotes a magnitude of difference of wavenumber vectors of incident and outgoing waves, respectively, $r_{mn}$ denotes a distance between centers of scatterers m and n, G(r) denotes the first function, N denotes the number of scatterers, $f_{ave}$ (q) denotes an average value of scattering factor $f_m$(q), $f_{ave}^*$(q) denotes an average value of scattering factor $f_n^*$(q), and $\rho_a$ denotes an average number of particles per unit volume of structure model.

4. A scattering measurement analysis method, comprising:

measuring, by a scattering measurement unit of an X-ray scattering measurement device, a scattering intensity of scattered X-ray generated from a sample;

obtaining, by the X-ray scattering measurement device, the measured scattering intensity data through an input unit or storage unit;

obtaining, by the X-ray scattering measurement device, a theoretical scattering intensity from a structure model that consists a plurality of scatterers, the obtaining of a theoretical scattering intensity including:

obtaining, by the X-ray scattering measurement device, a contribution to the theoretical scattering intensity of a pair of a scatterer "m" and a scatterer "n" existing at a distance "r" from the scatterer "m" among a plurality of scatterers by at least one of calculations in accordance with the distance "r", the calculations including:

obtaining, by the X-ray scattering measurement device, scattering factor $f_m$(q) of the scatterer "m" and $f_n^*$(q) of the scatterer "n" which is representative of complex conjugate for $f_n$(q);

obtaining, by the X-ray scattering measurement device, a probability density function $\rho_m$(r) of a number of scatterers existing at the distance "r";

a first calculation, by the X-ray scattering measurement device, of calculating contributions of the scatterer "m" and the scatterer "n" from respective scattering factors $f_m(q)$ and $f_n^*(q)$ and a center-to-center distance $r_{mn}$ between the scatterer "m" and the scatterer "n", and a second calculation, by the X-ray scattering measurement device, of substituting the scattering factor $f_n^*(q)$ of the scatterer "n" by a first representative value and substituting a probability density function of a number of scatterers existing at the distance "r" by a constant value;

fitting, by the X-ray scattering measurement device, the theoretical scattering intensity to the measured scattering intensity data;

evaluating, by the X-ray scattering measurement device, a fitting result; and finishing the evaluating the fitting result, by the X-ray scattering measurement device, when the fitting result is determined that the theoretical scattering intensity fits the measured scattering intensity data, wherein the first representative value substituting the scattering factor of the scatterer "n" is an average value of scattering factors of the plurality of scatter, wherein the theoretical scattering intensity includes, as one of a part of an integrand and a part of a numerical sequence to be summed, a second function that is derived in consideration of a coherence length of a probe to be used to measure scattering and monotonically decreases from 1 to 0 as the distance "r" increases, and one of the integrand and the sum is calculated in a range to the distance "r" at which the second function is 0, and wherein the theoretical scattering intensity is obtained based on following Equation (14), $$I(q) = \sum_m \sum_{n, r_{mn} < R} f_m(q) f_n^*(q) \frac{\sin q r_{mn}}{q r_{mn}} C(r_{mn}) + 4\pi N \rho_a f_{ave}(q) f_{ave}^*(q) \int_{r \geq R}^{\infty} r^2 \frac{\sin qr}{qr} C(r) dr, \quad (14)$$

where:
I (q) denotes the theoretical scattering intensity,
$f_m$ (q) denotes the scattering factor of scatterer m,
$f_n^*(q)$ denotes scattering factor of scatterer n,
q denotes a magnitude of difference of wavenumber vectors of incident and outgoing waves, respectively,
$r_{mn}$ denotes a distance between centers of scatterers m and n,
C(r) denotes the second function,
N denotes the number of scatterers,
$f_{ave}$ (q) denotes an average value of scattering factor fm (q),
$f_{ave}^*(q)$ denotes an average value of scattering factor $f_n^*(q)$, and
$\rho_a$ denotes an average number of particles per unit volume of structure model.

\* \* \* \* \*